US012629638B2

(12) United States Patent
Shen et al.

(10) Patent No.: US 12,629,638 B2
(45) Date of Patent: May 19, 2026

(54) FILTER ASSEMBLY WITH ELECTRODE

(71) Applicant: SAINT-GOBAIN PERFORMANCE PLASTICS CORPORATION, Solon, OH (US)

(72) Inventors: Hong Shen, DeForest, WI (US); Shing Hym Ng, Zhejiang (CN); Liqing Hong, Hangzhou (CN); Jean-Philippe Rakitic, Rosheim (FR); Jacob Andrews, Washington, DC (US)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 469 days.

(21) Appl. No.: 17/906,286

(22) PCT Filed: Mar. 9, 2021

(86) PCT No.: PCT/US2021/021514
§ 371 (c)(1),
(2) Date: Sep. 14, 2022

(87) PCT Pub. No.: WO2021/188323
PCT Pub. Date: Sep. 23, 2021

(65) Prior Publication Data
US 2023/0099715 A1     Mar. 30, 2023

Related U.S. Application Data

(60) Provisional application No. 62/990,127, filed on Mar. 16, 2020.

(51) Int. Cl.
*B01D 63/08* (2006.01)

(52) U.S. Cl.
CPC ...... *B01D 63/087* (2013.01); *B01D 2313/025* (2013.01); *B01D 2313/345* (2013.01)

(58) Field of Classification Search
CPC ............ B01D 63/087; B01D 2313/025; B01D 2313/345; B01D 2201/0423;
(Continued)

(56) References Cited

U.S. PATENT DOCUMENTS 2,647,636 A * 8/1953 Rafferty ............... B01D 35/023
                                                      210/446
3,782,083 A    1/1974 Rosenberg
(Continued)

FOREIGN PATENT DOCUMENTS

WO        2021188323 A1     9/2021

OTHER PUBLICATIONS

International Search Report and Written Opinion for PCT/US2021/021514, mailed Jun. 30, 2021, 9 pages.

*Primary Examiner* — Madeline Gonzalez
(74) *Attorney, Agent, or Firm* — Abel Schillinger, LLP; Chi Suk Kim

(57) ABSTRACT

Systems and methods are disclosed that include providing a filter assembly having a filter body with an inlet and an outlet, a filter membrane support disposed within the filter body between the inlet and outlet, a filter membrane coupled to the filter membrane support, and at least one component that passes through the inlet, the filter membrane support, and the outlet to carry an electrical current, a fluid, or combinations thereof through the filter.

19 Claims, 4 Drawing Sheets

(58) Field of Classification Search
CPC ........ B01D 2311/2603; B01D 2323/58; B01D
29/05; B01D 35/06
USPC .......... 210/243, 645, 746, 748.01, 782, 439,
210/446, 455, 490, 492, 321.75, 321.84
See application file for complete search history.

(56) References Cited

U.S. PATENT DOCUMENTS

| | | | |
|---|---|---|---|
| 5,088,997 | A | 2/1992 | Delahuerga et al. |
| 5,230,727 | A | 7/1993 | Pound et al. |
| 5,630,939 | A | 5/1997 | Bulard et al. |
| 5,885,499 | A * | 3/1999 | Aksberg .............. B01D 29/012 |
| | | | 264/DIG. 48 |
| 7,601,192 | B2 | 10/2009 | Boulay et al. |
| 7,892,223 | B2 | 2/2011 | Geiselhart |
| 8,123,840 | B2 | 2/2012 | Marra |
| 8,182,590 | B2 | 5/2012 | Striemer et al. |
| 9,675,755 | B2 | 6/2017 | Shick et al. |
| 2002/0025576 | A1 | 2/2002 | Northrup et al. |
| 2002/0084217 | A1 | 7/2002 | Schann |
| 2005/0035046 | A1 | 2/2005 | Hanson et al. |
| 2013/0264265 | A1 | 10/2013 | Lin |
| 2017/0090293 | A1 | 3/2017 | Nakata et al. |
| 2019/0336919 | A1 | 11/2019 | Kondo et al. |

* cited by examiner

FILTER ASSEMBLY WITH ELECTRODE

CROSS-REFERENCE TO RELATED APPLICATIONS

This application is a National Stage entry under 35 U.S.C. § 371 of International Application No. PCT/US2021/021514, filed Mar. 9, 2021, entitled "FILTER ASSEMBLY WITH ELECTRODE," by Hong SHEN et al, which claims priority to U.S. Provisional Patent Application No. 62/990,127, filed Mar. 16, 2020, entitled "FILTER ASSEMBLY WITH ELECTRODE," by Hong SHEN et al, both of which applications are assigned to the current assignee hereof and incorporated herein by reference in their entireties.

BACKGROUND ART

Filter assemblies are frequently used in the medical field to ensure sterile environmental or operating conditions. Some filters and assemblies employ a membrane which may filter out or separate suspended particulates from a fluid or gas passing through the filter assembly. Reliable operation of such filter assemblies remains critical to sterile medical procedures. Thus, the medical industry continues to demand improved filters.

SUMMARY

The present disclosure relates generally to a filter assembly having a compact, integrated design, and more particularly, relates to a filter assembly having a filter body comprising an inlet and an outlet, a filter membrane support coupled to at least one filter membrane and disposed within the filter body between the inlet and outlet, and at least one component that passes through the inlet, the filter membrane support, and the outlet to carry an electrical current, a fluid, a gas, or combinations thereof through the filter assembly.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings.

The use of the same reference symbols in different drawings indicates similar or identical items.

DETAILED DESCRIPTION OF THE PREFERRED EMBODIMENT(S)

Figure 1:
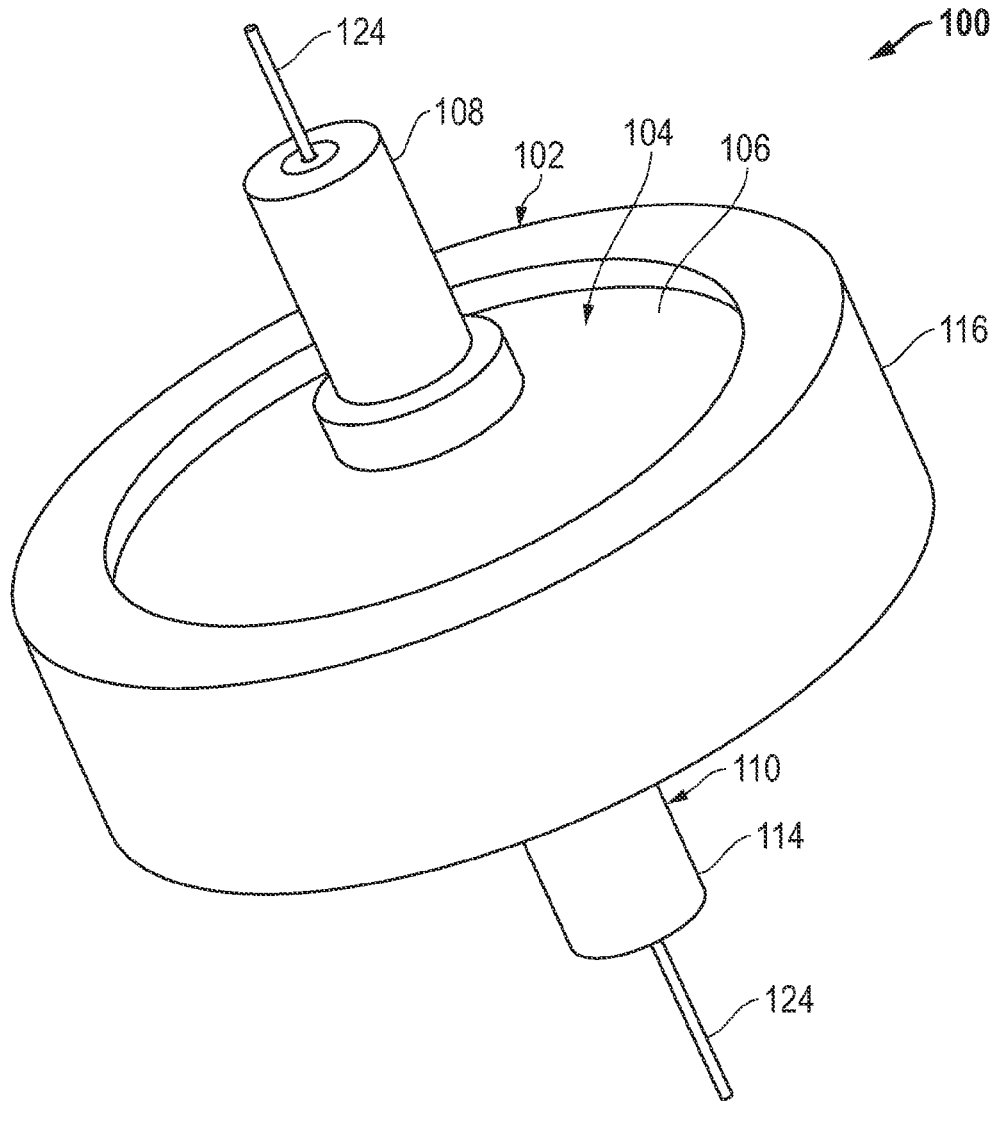
FIG. 1 is an oblique view of a filter assembly according to an embodiment of the disclosure.
Figure 2:
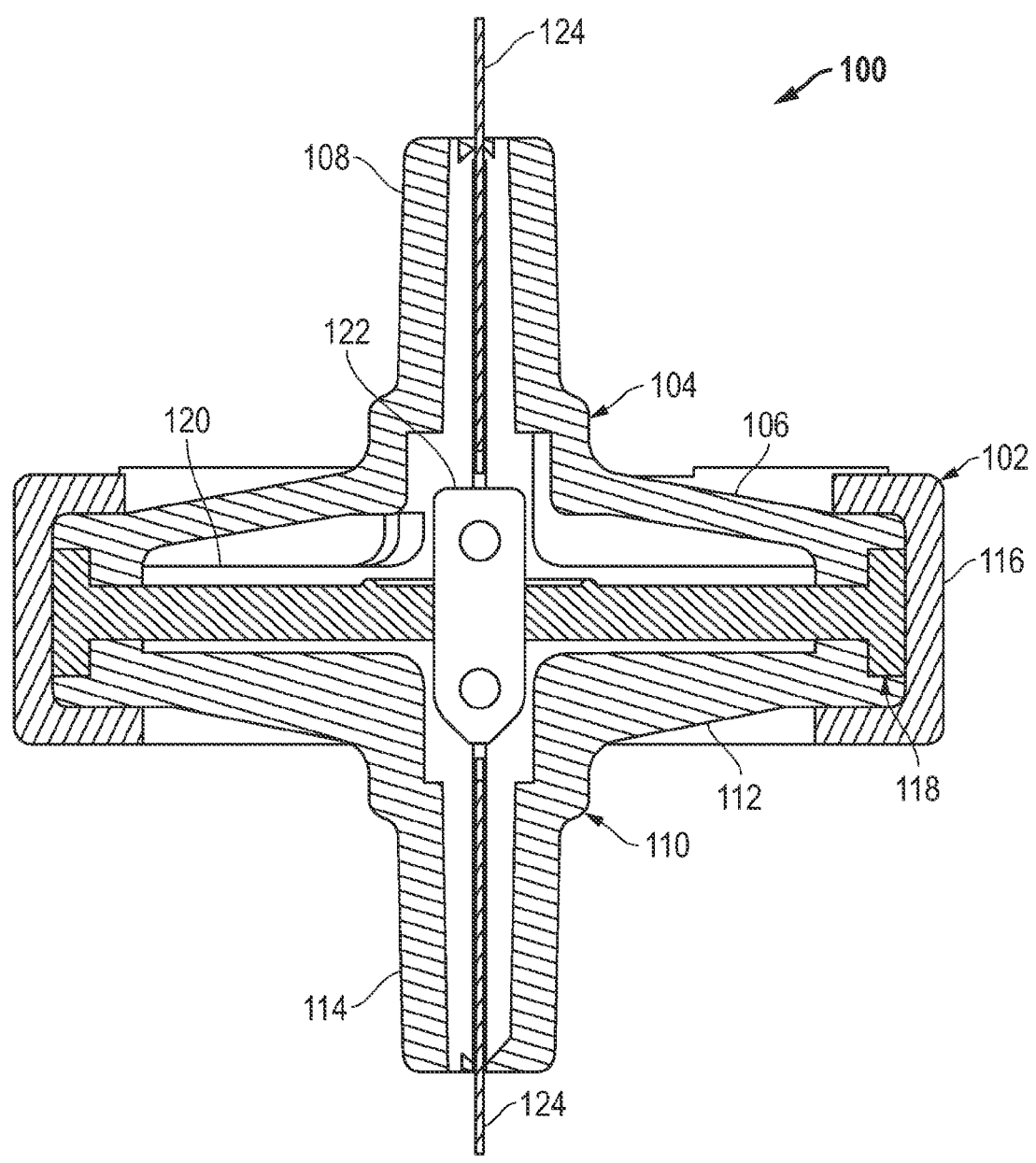
FIG. 2 is a cross-sectional view of the filter assembly of FIG. 1 according to an embodiment of the disclosure.

FIGS. 1 and 2 show an oblique view and a cross-sectional view of a filter assembly 100 according to an embodiment of the disclosure. The filter assembly 100 may generally comprise a filter body 102 comprising an inlet cap 104 having an inlet body 106 and at least one inlet 108 extending from the inlet body 106, an outlet cap 110 having an outlet body 112 and at least one outlet 114 extending from the outlet body 112, and an overmolding ring 116. The filter assembly 100 may also include a filter membrane support 118 disposed between the inlet cap 104 and the outlet cap 110, at least one filter membrane 120, and at least one component 122. When assembled, the overmolding ring 116 may at least partially annularly encompasses the inlet body 106, the filter membrane support 118, and the outlet body 112.

Figure 3:
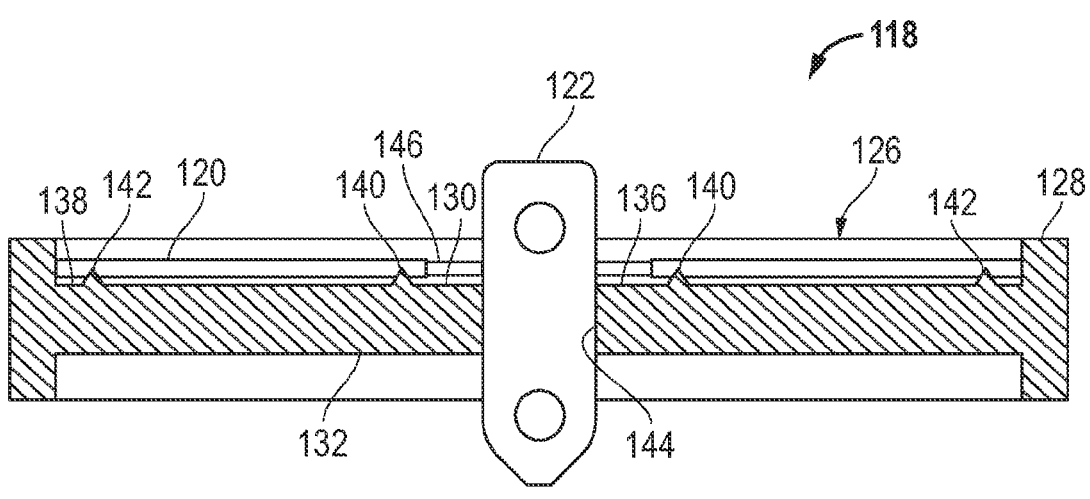
FIG. 3 is a cross-sectional view of a filter membrane support of the filter assembly of FIGS. 1 and 2 according to an embodiment of the disclosure.
Figure 4:
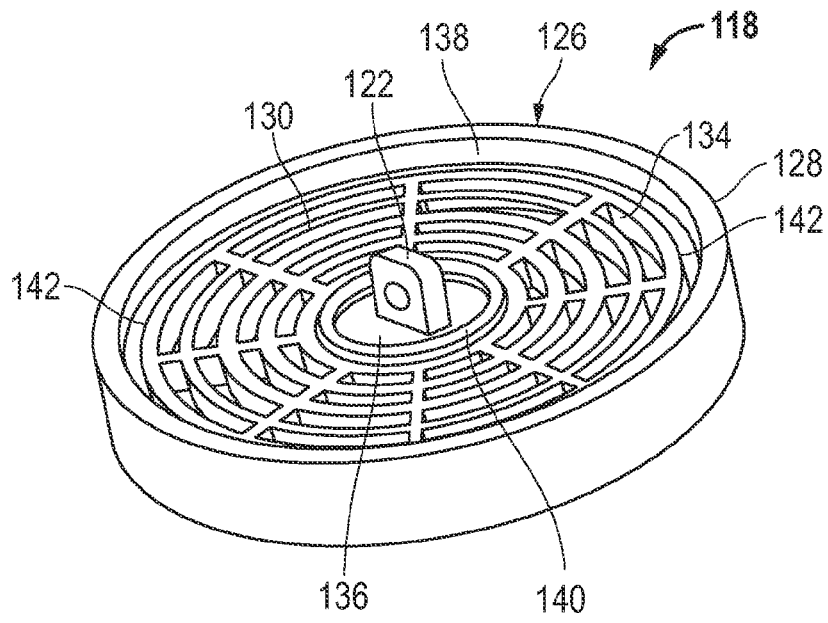
FIG. 4 is an oblique view of the filter membrane support of FIG. 3 according to an embodiment of the disclosure.

FIGS. 3 and 4 show a cross-sectional view and an oblique view of the filter membrane support 118 of the filter assembly 100 according to an embodiment of the disclosure. The filter membrane support 118 may generally comprise a body 126 comprising an outer annular ring 128, an inlet side having an inlet surface 130, and an outlet side having an outlet surface 132. The filter membrane support 118 may also comprise a plurality of apertures 134 disposed through the filter membrane support 118 and extending through the body 126 between the inlet surface 130 and the outlet surface 132. In some embodiments, the filter membrane support 118 may comprise a center portion 136 that is free of apertures 134 and/or an outer portion 138 adjacent to the outer annular ring 128 that is free of apertures 134.

Furthermore, in some embodiments, the filter membrane support 118 may comprise one or more filter membrane attachment features. In some embodiments, the center portion 136 of the filter membrane support 118 may comprise an inner annular filter membrane attachment feature 140. In some embodiments, the outer portion 138 of the filter membrane support 118 may comprise an outer annular filter membrane attachment feature 142. The filter membrane attachment features 140, 142 may generally comprise at least one raised portion extending from the inlet surface 130 of the filter membrane support 118 and annularly about the inlet surface 130 of the filter membrane support 118. In particular embodiments, the filter membrane attachment features 140, 142 may comprise a triangular cross-sectional profile. However, in other embodiments, the filter membrane attachment features 140, 142 may comprise an arced, hemispherical, rounded, rectangular, square, or other shaped cross-sectional profile.

The filter membrane 120 may generally comprise a substantially round shape that is disposed within the outer annular ring 128 and on an inlet side of the filter membrane support 118. In some embodiments, the filter membrane 120 may be coupled (e.g., adhered, ultrasonically welded, etc.) to the filter membrane support 118. In some embodiments, the filter membrane 120 may be coupled the inner annular filter membrane attachment feature 140 and/or the outer annular filter membrane attachment feature 142. In a particular embodiment, the filter membrane 120 may be ultrasonically welded to the filter membrane attachment features 140, 142. The ultrasonically welded filter membrane 120 may prevent fluid from passing through the apertures 134 in the filter membrane support 118 without first passing through the filter membrane 120. In other embodiments, the filter membrane 120 may be adhered to the filter membrane attachment features 140, 142 via adhesive, thermal welding, or any other suitable method that prevents fluid from passing through the apertures 134 in the filter membrane support 118 without first passing through the filter membrane 120.

In some embodiments, the filter membrane 120 may comprise a single membrane element. In other embodiments, the filter membrane 120 may comprise multiple membrane elements. For example, in some embodiments, the filter membrane 120 may comprise a first filter membrane element that is hydrophilic and a second filter membrane element that is hydrophobic. Furthermore, it will be appreciated that the filter membrane 120 may be formed from a fluoropolymer, a perfluoropolymer, PTFE, PVF, PVDF, PCTFE, PFA, PEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PEI or TPI, or any combination thereof.

The at least one component 122 may generally pass through a component aperture 144 formed in the center portion 136 of the body 126 of the filter membrane support 118. In some embodiments, the component aperture 144 may comprise an interference fit with the at least one component 122, such that the at least one component 122 is integrally formed with the filter membrane support 118. In particular embodiments, the at least one component 122 may be overmolded into the center portion 136 of the body 126 of the filter membrane support 118 during formation and/or molding of the filter membrane support 118. In other particular embodiments, the at least component may be press fit into the component aperture 144 formed in the center portion 136 of the body 126 of the filter membrane support 118 after formation and/or molding of the filter membrane support 118. In other embodiments, the component aperture 144 may comprise a clearance fit with the at least one component 122. However, it will be appreciated that the at least one component 122 may be sealed with the component aperture 144 formed in the center portion 136 of the body 126 of the filter membrane support 118. In particular embodiments, the at least one component 122 may be sealed with the component aperture 144 formed in the center portion 136 of the body 126 of the filter membrane support 118 by an adhesive, a caulk, a silicon, or any combination thereof. When assembled, the at least one component 122 may pass through the filter membrane support 118 beyond each of the inlet surface 130 and the outlet surface 132. Additionally, the at least one component 122 may pass through an aperture 146 formed in the filter membrane 120. In some embodiments, the at least one component 122 may pass through the aperture 146 formed in the filter membrane 120 without contacting the filter membrane 120.

In some embodiments, the at least one component 122 may comprise an electrode or other electrically conductive component. In particular embodiments, the at least one component 122 may comprise an electrode comprising a plurality of connections, holes, receptacles for connection to an electrical conductor (e.g., wire) 124 on each of the inlet side 130 and the outlet side 132. Thus, in some embodiments, an electrical current may be carried through the electrode or the electrical connection component and/or the electrical conductors 124. In some embodiments, the electrical current may be carried to an external medical component or device. In alternative embodiments, the electrical current may impart an electrostatic charge to the filter membrane 120 to provide an electrostatically charged filter membrane 120 to filter out particulates from a fluid passing through the filter membrane 120.

In some embodiments, the at least one component 122 may comprise a hose, tube, or other vessel comprising at least one lumen for carrying a fluid therethrough. Thus, in some embodiments, the hose, tube, or other vessel may carry a fluid therethrough. In particular embodiments, the direction of flow of the fluid through the hose, tube, or other vessel may be in a similar direction to the direction of the flow of fluid through the filter membrane 120. In other particular embodiments, the direction of flow of the fluid through the hose, tube, or other vessel may be in an opposite direction to the direction of the flow of fluid through the filter membrane 120. Accordingly, it will be appreciated that the flow of fluid through the hose, tube, or other vessel is not filtered by the filter membrane 120. In some embodiments, the fluid flowing through the hose, tube, or other vessel may be different than the fluid flowing through the filter membrane 120. In some embodiments, the fluid flowing through the hose, tube, or other vessel may be in a different phase (e.g., liquid, gas, or combination thereof) than the fluid flowing through the filter membrane 120. Furthermore, in some embodiments, the filter membrane 120 may be under positive pressure, and wherein the hose, tube, or other vessel may be under vacuum. As such, in particular embodiments, the filter membrane 120 may filter a flow of fluid passing to another device, a local surgical site, a sterile surgical environment, or any other location, while the hose, tube, or other vessel may carry a return flow of fluid from the other device, the local surgical site, the sterile surgical environment, or any other location. Still further, in alternative embodiments, the at least one component 122 may comprise a combination of any number of electrodes, other electrically conductive components, and/or hoses, tubes, and/or other vessels.

It will be appreciated that a hose, tube, or other vessel comprising a lumen may be connected to each of the inlet 108 and the outlet 114 of the filter assembly 100 to carry a fluid therethrough. As a result, the fluid passing through the inlet 108 must necessarily pass through the filter membrane 120 before exiting the filter assembly through the outlet 104. As such, in some embodiments, the electrical conductors 124 may pass through the hoses, tubes, or other vessels connected to the inlet 108 and the outlet 114. Further, in some embodiments, the hose, tube, or other vessel may pass through the hoses, tubes, or other vessels connected to the inlet 108 and the outlet 114 to provide a so-called hose-in-hose configuration. Therefore, the filter assembly 100 provides a more compact, convenient configuration than current traditional filter assemblies.

Figure 5:
FIG. 5 is a flowchart of a method of operating a filter assembly according to an embodiment of the disclosure.
Figure 5:
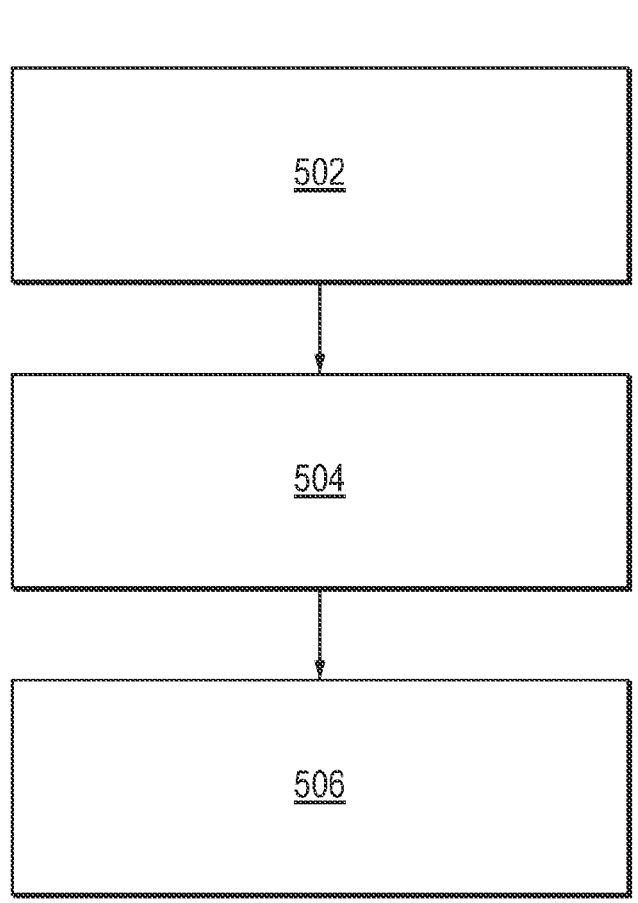

FIG. 5 shows a flowchart of a method 500 of operating a filter assembly 100 according to an embodiment of the disclosure. Method 500 may begin at block 502 by providing the filter assembly 100 comprising a filter body 102, an inlet 108, an outlet 114, a filter membrane support 118 disposed within the filter body 102 between the inlet 108 and the outlet 114, a filter membrane 120 coupled to the filter membrane support 118, and at least one component 122 that passes through the inlet 108, the filter membrane support 118, and the outlet 114. Method 500 may continue at block 504 by passing a fluid flow into the inlet 108, through the filter membrane 120, and out of the outlet 114. Method 500 may continue at block 506 by passing at least one of an electrical current and a fluid flow through the at least one component 122. In some embodiments, the at least one component 122 may comprise an electrode or other electrically conductive component that carries an electrical current therethrough to an external medical component or device. In other embodiments, the at least one component 122 may comprise a hose, tube, or other vessel comprising at least one lumen that carries a fluid flow therethrough, wherein the direction of flow of fluid through the hose, tube, or other vessel is opposite to the direction of flow of fluid through the filter membrane, and wherein the fluid flow through the tube is not filtered by the filter membrane.

In some embodiments, a filter assembly 100 may include one or more of the following embodiments:

Embodiment 1. A filter assembly, comprising: a filter body comprising an inlet and an outlet; a filter membrane support disposed within the filter body between the inlet and outlet; a filter membrane coupled to the filter membrane support; and at least one component that passes through the inlet, the filter membrane support, and the outlet.

Embodiment 2. The filter assembly of embodiment 1, wherein the filter body comprises an inlet cap comprising an inlet body and the inlet extending from the inlet body and an outlet cap comprising an outlet body and the outlet extending from the outlet body.

Embodiment 3. The filter assembly of embodiment 2, wherein the filter body comprises an overmolding ring that at least partially annularly encompasses the inlet body, the filter membrane support, and the outlet body.

Embodiment 4. The filter assembly of embodiment 2, wherein the filter membrane support is disposed between the inlet cap and the outlet cap.

Embodiment 5. The filter assembly of embodiment 4, wherein the filter membrane support comprises a body comprising an outer annular ring, an inlet side having an inlet surface, and an outlet side having an outlet surface.

Embodiment 6. The filter assembly of embodiment 5, wherein the filter membrane support comprises a plurality of apertures extending through the body between the inlet surface and the outlet surface.

Embodiment 7. The filter assembly of embodiment 6, wherein the filter membrane support comprises a center portion that is free of apertures.

Embodiment 8. The filter assembly of embodiment 7, wherein the filter membrane support comprises an outer portion adjacent to the outer annular ring that is free of apertures.

Embodiment 9. The filter assembly of embodiment 8, wherein each of center portion and the outer portion comprises a filter membrane attachment feature.

Embodiment 10. The filter assembly of embodiment 9, wherein each of the filter membrane attachment features comprises at least one raised portion extending from the inlet surface and annularly about the inlet surface of the filter membrane support.

Embodiment 11. The filter assembly of embodiment 10, wherein the filter membrane is ultrasonically welded to the raised portions at each of the center portion and the outer portion.

Embodiment 12. The filter assembly of embodiment 11, wherein the ultrasonically welded filter membrane prevents fluid from passing through apertures in the filter membrane support without passing through the filter membrane.

Embodiment 13. The filter assembly of embodiment 1, wherein the filter membrane comprises a substantially round shape having an aperture through the filter membrane.

Embodiment 14. The filter assembly of embodiment 1, wherein the at least one component is overmolded into a center portion of the body of the filter membrane support.

Embodiment 15. The filter assembly of embodiment 7, wherein the at least one component passes through a component aperture formed in the center portion of the body of the filter membrane support.

Embodiment 16. The filter assembly of embodiment 15, wherein the at least one component is press fit into the component aperture formed in the center portion of the body of the filter membrane support.

Embodiment 17. The filter assembly of embodiment 15, wherein the at least one component is sealed with the component aperture formed in the center portion of the body of the filter membrane support.

Embodiment 18. The filter assembly of embodiment 17, wherein the at least one component is sealed with the component aperture formed in the center portion of the body of the filter membrane support by at least one of an adhesive, a caulk, a silicon, or a combination thereof.

Embodiment 19. The filter assembly of embodiment 13, wherein the at least one component passes through the aperture of the filter membrane.

Embodiment 20. The filter assembly of embodiment 19, wherein the at least one component is not in contact with the filter membrane.

Embodiment 21. The filter assembly of embodiment 1, wherein the at least one component is an electrode, another electrically conductive component, a tube, or a combination thereof.

Embodiment 22. The filter assembly of embodiment 21, wherein an electrical current is carried through the electrode or the other electrically conductive component.

Embodiment 23. The filter assembly of embodiment 22, wherein the electrical current is carried to a medical device.

Embodiment 24. The filter assembly of embodiment 21, wherein the tube carries a fluid therethrough, and wherein the direction of flow of the fluid through the tube is opposite of the direction of flow through the filter membrane.

Embodiment 25. The filter assembly of embodiment 24, wherein the fluid flow through the tube is not filtered by the filter membrane.

Embodiment 26. The filter assembly of embodiment 24, wherein the filter membrane is under positive pressure, and wherein the tube is under vacuum.

Embodiment 27. The filter assembly of embodiment 1, wherein the filter membrane comprises a first filter membrane element and a second filter membrane element, wherein the first filter membrane element is hydrophilic, and wherein the second filter membrane element is hydrophobic.

Embodiment 28. The filter assembly of embodiment 1, wherein the filter membrane is formed from PTFE.

Embodiment 29. A method of operating a filter assembly, comprising: providing the filter assembly comprising a filter body, an inlet, an outlet, a filter membrane support disposed within the filter body between the inlet and the outlet, a filter membrane coupled to the filter membrane support, and at least one component that passes through the inlet, the filter membrane support, and the outlet; passing a fluid flow into the inlet, through the filter membrane, and out of the outlet; and passing at least one of an electrical current and a fluid flow through the at least one component.

Embodiment 30. The method of embodiment 29, wherein the at least one component comprises an electrode that carries an electrical current therethrough to a medical device.

Embodiment 31. The method of embodiment 29, wherein the at least one component comprises a tube that carries a fluid flow therethrough, and wherein the direction of flow through the tube is opposite the direction of flow through the filter membrane.

Embodiment 32. The method of embodiment 31, wherein the fluid flow through the tube is not filtered by the filter membrane.

Embodiment 33. The filter assembly of embodiment 1 or the method of embodiment 29, wherein the at least one filter membrane is ultrasonically welded to the filter membrane support.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A filter assembly, comprising:
   a filter body comprising an inlet and an outlet;

a filter membrane support disposed within the filter body between the inlet and outlet;
   a filter membrane coupled to the filter membrane support; and
   at least one component that passes through the inlet, the filter membrane support, and the outlet, wherein the at least one component is fixed into a set position relative to the filter membrane support, wherein the at least one component is an electrode, another electrically conductive component, a tube, or a combination thereof.

2. The filter assembly of claim 1, wherein the filter body comprises an inlet cap comprising an inlet body and the inlet extending from the inlet body and an outlet cap comprising an outlet body and the outlet extending from the outlet body.

3. The filter assembly of claim 2, wherein the filter body comprises an overmolding ring that at least partially annularly encompasses the inlet body, the filter membrane support, and the outlet body.

4. The filter assembly of claim 2, wherein the filter membrane support is disposed between the inlet cap and the outlet cap.

5. The filter assembly of claim 4, wherein the filter membrane support comprises a body comprising an outer annular ring, an inlet side having an inlet surface, and an outlet side having an outlet surface.

6. The filter assembly of claim 1, wherein the filter membrane support comprises a plurality of apertures extending through the body between an inlet surface and an outlet surface of the filter membrane support.

7. The filter assembly of claim 1, wherein the filter membrane is ultrasonically welded to the filter membrane support.

8. The filter assembly of claim 5, wherein each of a center portion and an outer portion of the filter membrane support comprises a filter membrane attachment feature.

9. The filter assembly of claim 8, wherein the filter membrane attachment feature comprises at least one raised portion extending from the inlet surface and annularly about the inlet surface of the filter membrane support, and wherein the filter membrane is ultrasonically welded to each of the filter membrane attachment features.

10. The filter assembly of claim 1, wherein the at least one component is overmolded into a center portion of a body of the filter membrane support.

11. The filter assembly of claim 1, wherein the at least one component is not in contact with the filter membrane.

12. The filter assembly of claim 1, wherein an electrical current is carried through the electrode or the other electrically conductive component to a medical device.

13. The filter assembly of claim 1, wherein the tube carries a fluid therethrough, wherein the direction of flow of the fluid through the tube is opposite of the direction of flow through the filter membrane, and wherein the fluid flow through the tube is not filtered by the filter membrane.

14. The filter assembly of claim 1, wherein the filter membrane comprises a first filter membrane element and a second filter membrane element, wherein the first filter membrane element is hydrophilic, and wherein the second filter membrane element is hydrophobic.

15. The filter assembly of claim 1, wherein the at least one component is integrally formed with the filter membrane support.

16. The filter assembly of claim 10, wherein the at least one component passes through a component aperture formed in the center portion of the body of the filter membrane support.

17. The filter assembly of claim 16, wherein the at least one component is press fit into the component aperture formed in the center portion of the body of the filter membrane support.

18. The filter assembly of claim 16, wherein the at least one component is sealed with the component aperture formed in the center portion of the body of the filter membrane support.

19. The filter assembly of claim 1, wherein the filter membrane is formed from a fluoropolymer, a perfluoropolymer, a polyarylketone, a polysulfone, aromatic polyamides, thermoplastic polyimides, or any combination thereof.

\* \* \* \* \*